United States Patent [19]

Kanarek

[11] 3,847,737

[45] Nov. 12, 1974

[54] INACTIVATION OF MYXOVIRUSES AND METHOD OF PREPARING A VACCINE THEREFROM

[76] Inventor: Alexander David Kanarek, 183-193 Euston Rd., London, England

[22] Filed: June 11, 1968

[21] Appl. No.: 736,006

Related U.S. Application Data

[63] Continuation-in-part of Ser. No. 441,835, March 22, 1965, abandoned.

[52] U.S. Cl.................... 195/1.4, 195/1.5, 424/89
[51] Int. Cl. ...................... C12k 7/00, C12k 5/00
[58] Field of Search ....... 424/89, 307, 350; 195/1.4, 195/1.5

01152[56] References Cited

UNITED STATES PATENTS

| | | | |
|---|---|---|---|
| 2,798,836 | 7/1957 | Bird et al. .............................. | 424/89 |
| 3,269,912 | 8/1966 | Grafe .................................... | 424/89 |

OTHER PUBLICATIONS

Norrby, Proceedings for the Society for Experimental Biology and Medicine, Vol. 111, pages 814-818, Dec. 1962.

*Primary Examiner*—Richard L. Huff
*Attorney, Agent, or Firm*—Delio and Montgomery

[57] ABSTRACT

A method for inactivating myxoviruses without significant loss of antigenic activity, which comprises contacting the myxoviruses in an aqueous suspension at a pH between 6 and 8 in the presence of at least about 0.05 percent w/v of a surface active agent selected from the class of polyoxyethylene ester of partial oleic acid, polyoxyethylene ester of lauric acid, polyoxyethylene ester of palmitic acid, and polyoxyethylene ester of stearic acid, with an organic solvent selected from the class consisting of chlorinated lower hydrocarbon having from 2 to 5 carbon atoms and chlorinated and fluorinated lower hydrocarbon having from 2 to 5 carbon atoms, the solvent being liquid at room temperature.

7 Claims, No Drawings

INACTIVATION OF MYXOVIRUSES AND METHOD OF PREPARING A VACCINE THEREFROM

This application is a continuation-in-part of U.S. patent application Ser. No. 441,835 filed Mar. 22, 1965, now abandoned.

This invention relates to the inactivation of myxoviruses and, in particular, to the production of vaccines therefrom.

The myxovirus group includes the viruses of the influenza group *M. influenzae-A*, *M. influenzae-B*, *M. influenzae-C*, and *M. multiformae* (Newcastle disease virus), the parainfluenza group *M. parainfluenzae*-1 (formerly *M. influenzae-D* or Sendai virus), *M. parainfluenzae*-2 (acute laryngotrachaeobronchitis virus), *M. parainfluenzae*-3 (hemadsorption virus) and *M. parainfluenzae*-4 (M.25 virus) *M. pestigalli* (fowl plague virus), *M. parotidis* (mumps virus), measles virus, distemper virus, rinderpest virus and respiratory syncytical virus. These viruses are pathogenic, and cause overt or inapparent infections, which are frequently associated with an inflammation in the respiratory tract.

The diseases caused by myxoviruses are associated with an immune response, thus susceptible animals or persons can be protected against the disease by vaccination. To produce a vaccine, the virus must be deprived of its infective properties without losing its antigenic activity, i.e., the ability to stimulate the production of antibodies in the tissues of susceptible animals or persons. This may be effected by attenuation, which only alters the virus so as to lose its pathogenicity, or by inactivation, which also deprives the virus of its ability to multiply. When this inactivation is carried out with formaldehyde, considerable losses in antigenicity can be observed and, also, neutralizing agents have to be added subsequently to the system.

It has been shown that several members of the myxovirus group can be inactivated in aqueous suspension by contacting the suspension with diethyl ether in the presence of a polyoxyethylene sorbitan mono-oleate. However, this method suffers from the disadvantage that special and expensive equipment is needed to reduce the risk of fire owing to the inflammability of diethyl ether and that about 7 percent diethyl ether remains dissolved in the aqueous medium.

It has now been discovered that members of the myxovirus group can advantageously be inactivated without significant loss of antigenic activity, by contacting the aqueous suspension of the virus with certain non-inflammable organic solvents which are immiscible or partially miscible with water, in the presence of a non-ionizing hydrophilic surface active agent, such as a polyoxyethylene sorbitan mono-oleate. Organic solvents which have been found useful in carrying out the method according to the invention are fully or partially chlorinated, or chlorinated and fluorinated lower hydrocarbons other than chloroform. They include tetrachloro-methane; trichloro-ethylene; tetrachloro-ethylene; 1,1,2-trichloro-1,2,2-trifluoro-ethane; 1,1,1,3,3,3-hexachloropropane and hexachloro-buta-1,3-diene. When inactivating measles virus by the method of the present invention, the best results (i.e., highest antigenicities) have been obtained with tetrachloro-ethylene. Not infrequently, higher antigenicities have been observed after inactivation than before.

To provide the non-ionizing hydrophylic surface active agent, a polyoxyethylene sorbitan mono-oleate (such as marketed by Messrs. Atlas Manufacturing Co., under the trade name TWEEN 80) may conveniently be used. Other agents falling into this class, such as polyoxyethylene ethers of partial lauric, palmitic or stearic acid esters (Tween 20, 40 and 60), as well as other oleic acid esters, have also been found satisfactory for the purpose. Such surfactants have molecular weights generally in the range of 1,220 to 1,320. As used herein, "Tween" is a trademark of the Atlas Manufacturing Company for each member of a series of general purpose emulsifiers and surface active agents. They are polyoxyethylene derivatives of fatty acid partial esters of hexitol anhydrides. (See: "The Condensed Chemical Dictionary," Sixth Ed., Reinhold Publishing Corporation, N.Y.; See also, "The Handbook of Material Trade Names," Zimmerman and Lavine (1953), Industrial Research Service pages 586–587, wherein "Tween" is defined as the polyoxylene derivative of in the case of Tween 20 Sorbitan monolaurate
Tween 40 Sorbitan monopalmitate
Tween 60 Sorbitan monostearate
Tween 80 Sorbitan mono-oleate)

To be effective, the concentration of the agent should be at least about 0.05 percent. Below this, increasing losses in antigenicity may be observed. Within reasonable limits, relatively high concentrations of the agent may be used without any harmful effect, but above 0.2 percent no further improvement can usually be observed. The pH of the aqueous suspension is adjusted to a value between pH 6.0 and 8.0, preferably between pH 6.5 and 7.5.

The volume of the solvent, relative to the volume of the aqueous suspension containing the virus, is unimportant insofar as two distinct phases are formed and the proportion of volumes is not excessive so as to make contacting inconvenient or inefficient. It may conveniently be between 8 percent and 30 percent of the volume of the aqueous suspension. To secure a satisfactory contact with the virus, the two phases are thoroughly mixed, preferably for at least one hour.

For the purposes of the present invention, any strain of the selected virus, which is substantially free of contaminating viruses, may be used. In the case of measles virus, the Edmonston strain has been found satisfactory and has been preferred because it is commonly used in the production of measles vaccines. This strain may, for instance, conveniently be grown on a chick embryo tissue culture or a monkey kidney tissue culture, or on a culture of a stable diploid cell line as the Wistar strain. The tissue culture fluid (TCF) is usually harvested and clarified by slow centrifugation or filtration. The fluid is then treated and the virus therein inactivated by contacting it with a solvent according to the present invention. Subsequently, the solvent is removed, for instance by centrifugation and decantation. The suspension containing the inactivated virus particles constitutes a primary vaccine in which fragments of the virus particles carry the antigenic activity.

Viruses belonging to the influenza group (A, B, C and *M. multiformae*) may also be grown on a chick embryo tissue culture or a monkey kidney tissue culture, or they may conveniently be grown in embryonated hens' eggs. In the latter case, the harvested allantoic fluid is treated with a solvent according to the invention. After the removal of the solvent, the aqueous suspension constitutes the primary vaccine.

The primary vaccine itself may be used for inoculation or it may be further improved by purification or concentration. Stabilizers such as polyvinyl pyrollidine or dextran, may also be added to the vaccine.

It has also been found that a primary vaccine, containing myxoviruses inactivated by the present method, can be purified and, if disired, presented in a concentrated form by adsorbing the fragments of virus particles onto an aluminium salt, which is not more than slightly soluble in a neutral medium. Examples of such a salt are aluminium phosphate, a pharmaceutically acceptable alum, aluminium hydroxide or oxide. The aluminium salt, with the antigenic substance adsorbed on it can be separated and resuspended in a new medium, which may have a smaller volume than the volume of the primary vaccine. The adsorption may be carried out at a pH between pH 6 and pH 8, preferably between pH 6 and pH 7. For example, a primary measles vaccine may conveniently be adjusted to the required pH and a suspension of the aluminium salt may then be added in an aqueous solution adjusted to a pH close to the required pH value. The mixture may then be shaken for about an hour and the adsorbent sedimented, separated and resuspended in a new medium, usually consisting of a saline solution buffered to a pH between 6.0 and 8.0.

In the case of potassium alum as an adsorbent, a soluble aluminium salt may be added in solution to a primary vaccine and then the alum is precipitated from the solution by the addition of an appropriate potassium salt and adjustment of the pH to the required value. The concentration of the adsorbent may be chosen according to the concentration of the antigen, and may conveniently be around 1.0 mg./ml. at the adsorption stage and around 4.0 mg./ml. in the concentrated vaccine.

Protamine sulphate may also be added to the primary vaccine before the addition of the adsorbent; protamine is also partially or fully adsorbed on the aluminium salt and is not eluted therefrom when resuspended in new medium at a pH around pH 6.0.

A purified or concentrated vaccine produced according to the invention may be mixed with other vaccines or the aluminium salt may also be used to adsorb other materials having different antigenicity, provided that the constituents are mutually compatible.

The antigenic activity of a tissue culture fluid or a vaccine may be tested by intramuscularly injecting a dose of the fluid or the vaccine into susceptible animals and measuring the antibody response in the sera obtained from the animals after a suitable period. In the case of measles virus an assay of these sera may be carried out by methods well known in immunology such as by neutralising the infectivity of a standard pool of measles virus (Neut. test), or by the haemagglutination inhibition test (HAI. test), in which a diluted series of the serum is mixed with a standard pool of haemagglutinating measles virus, and the highest dilution causing complete inhibition of haemagglutination is recorded.

In the case of measles virus grown on monkey kidney tissue cultures, it has also been possible to test the antigenicity of these suspensions in vitro by the haemagglutionation activity test (HA. test), as this type of virus has such an activity. It has been proved and is accepted in immunology that the haemagglutinating activity and thus the HA. test is positively correlated with the antigenicity of this family of viruses, and can therefore be used as a measure and in vitro test of antigenicity. Measles virus grown on chick embryo tissue culture has no haemagglutinating activity, and no suitable method has hitherto been available for the efficient in vitro testing of these vaccines.

The antigenic activity of tissue culture fluids and vaccines containing measles virus having no haemagglutinating activity can now be tested in vitro by the Antibody Combining Test (AbC test). In this test a diluted series of samples of the culture fluid or vaccine is mixed with a standard dilution of antiserum, having predetermined antibody content. After incubation, standard haemagglutinating antigen and a suspension of *Erythrocebus patas* red blood cells are added, and the samples are again incubated. Where the test antigen is present in a sufficient amount, the haemagglutination inhibiting action of the serum is blocked and the red cells are agglutinated. The test results obtained by this method have been found to be positively and adequately corelated with the direct tests of antigenic activity, using the serum of inoculated animals.

The infectivity of tissue culture fluids and that of the vaccine is determined by the highest dilution that produce infection in 50 percent of the standard tissue cultures (TCD 50.). It has been found that the infectivity of the virus after inactivation by the treatment according to the present invention has been reduced to below detectable levels.

According to the present invention in one aspect therefore, there is provided a method for the inactivation of myxoviruses which method comprises contacting the viruses in an aqueous suspension at a pH between 6 and 8 in the presence of at least about 0.05 percent w/v of a non-ionizing hydrophilic surface active agent with a fully or partially chlorinated, or chlorinated and fluorinated lower hydrocarbon other than chloroform, which is liquid at room temperature. In another aspect there is provided a primary vaccine which contains antigens derived from myxoviruses inactivated by the method of the present invention.

In a further aspect, there is provided a method for producing a purified or concentrated vaccine, which method comprises adsorbing fragments of myxovirus particles, obtained by inactivating the viruses as hereinbefore described, from an aqueous medium at a pH between 6 and 8 on to an aluminium salt, which is pharmaceutically acceptable and is not more than slightly soluble at this pH, separating the salt and resuspending it in a new medium. In another aspect there is provided a purified vaccine, comprising an aluminium salt, having fragmented measles virus particles adsorbed on it, suspended in an aqueous medium.

The following examples illustrate the invention.

EXAMPLE 1

An Edmonston strain of measles virus was grown and propagated in a chick embryo tissue culture maintained on a serum free medium (S.M. 199). The harvested tissue culture fluid (TCF) was clarified by centrifugation at a low speed.

A 6.25 percent w/v solution of Tween 80 (Atlas Manufacturing Co.) (9 ml.) was added to the clarified tissue culture fluid (441 ml.), and the fluid was then thoroughly mixed with tetrachloro-ethylene (50 ml.) at room temperature for 1 hour.

The solvent was subsequently removed by centrifugation. The aqueous phase collected contained less than 0.01 percent tetrachloro-ethylene and constituted a primary vaccine.

The vaccine was assayed for infectivity, and also for antigenic activity by injecting it twice (10 days apart) into guinea pigs, bleeding the animals for antibody on the 7th day after the second injection, and testing the antibody content of the sera by the Neutr. test and HAI. test methods. The vaccine was also tested by the Antibody Combining Test in vitro. Results were as follows.

|  | Infectivity | Geometric Mean Titre of Guinea Pig Sera | | In vitro AbC test |
| --- | --- | --- | --- | --- |
|  |  | HAI test | Neutr. test |  |
| TCF | $10^{4.7}$ | 128 | 168 | 16 |
| Primary vaccine | 0 | 215 | 83 | 16 |

EXAMPLE 2

Measles virus tissue culture fluid (1176 ml.) prepared as in Example 1, was clarified by filtration. To this clarified fluid a 5 percent solution of Tween 80 (24 ml.) and tetrachloro-ethylene (106 ml.) was added. The fluid was then thoroughly mixed with the solvent for one hour, and was subsequently separated from it by centrifugation.

The primary vaccine was assayed for infectivity and antigenic activity as in Example 1. Results were as follows.

|  | Infectivity | G.M.T. of Guinea pig sera | |
| --- | --- | --- | --- |
|  |  | HAI test | Neutr. test |
| TCF | $10^{4.5}$ | 128 | 168 |
| Primary vaccine | 0 | 128 | 98.5 |

EXAMPLE 3

An Edmonston strain of measles virus was grown and propagated in an *Erthrocebus patas* monkey kidney tissue culture maintained on a serum free medium (S.M. 199). The harvested tissue culture fluid was clarified by slow centrifugation, and Tween 80 was added to a final concentration of 1.25 mg./ml. The fluid was then shaken with an equal volume of tetrachloromethane for 4 hours at room temperature. After shaking, the solvent was removed by centrifugation, and the aqueous layer was tested for infectivity and for antigenic activity by the HAI test and Neutr. test as in Example 1, and also by the HA. test. Results were as follows.

|  | Infectivity | G.M.T. of Guinea pig sera | | in vitro HA. test |
| --- | --- | --- | --- | --- |
|  |  | HAI test | Neutr. test |  |
| TCF | $10^{4.7}$ | 51 | 323 | 12 |
| Primary vaccine | 0 | 128 | 363 | 16 |

EXAMPLE 4

To a tissue culture fluid prepared as in Example 3, a solution of Tween 80 was added to a concentration of 1.25 mg./ml. The fluid was then shaken with an equal volume of tetrachloro-ethylene. The solvent was then removed and the aqueous layer tested. Results were as follows.

|  | Infectivity | HA. test |
| --- | --- | --- |
| TCF | $10^{4.7}$ | 4 |
| Primary vaccine | 0 | 4 |

EXAMPLE 5

Samples of a tissue culture fluid, prepared as in Example 3, were shaken with 10 percent v/v trichloro-ethylene, 1,1,1,3,3,3-hexachloropropane, hexachloro-buta-1,3-diene and 1,1,2-trichloro-1,2,2-trifluoroethane, respectively.

The solvents were removed by centrifugation and the samples were assayed in vitro for antigenic activity by the HA. test. In all cases at least 50 percent of the HA. activity was retained and no infectivity was shown after inactivation.

EXAMPLE 6

To a tissue culture fluid (40 ml.) prepared as in Example 3, a 6.25 percent solution of Tween 80 (9 ml.) a 5 percent solution of polyvinyl pyrrolidine (40 ml.) and tetrachloro-ethylene (50 ml.) were added. The mixture was homogenised for 4 hours, and the solvent was subsequently separated. The vaccine was assayed for infectivity and antigenic activity by the HAI. test. Results were as follows.

|  | Infectivity | HAI. test |
| --- | --- | --- |
| TCF | $10^{4.0}$ | 40 |
| Primary vaccine | 0 | 64 |

EXAMPLE 7

A Herts. strain of Newcastle disease virus was cultivated in embryonated hen's eggs. To a sample of the allantoic fluid (9.8 ml.) a 5 percent solution of Tween 80 (0.2 ml.) and tetrachloroethylene (1 ml.) or, in another test, 1,1,2-trichloro-1,2,2-trifluoro-ethane (1 ml.) was added.

The samples were shaken for 4 hours and were then centrifuged. The aqueous layer was removed and was tested for HA. activity, fowl red blood cells being used. Results were as follows.

|  | HA. test |
|---|---|
| Original allantoic fluid | 2048 |
| Tetrachloro-ethylene treated vaccine | 4096 |
| 1,1,2-trichloro-1,2,2-trifluoro-ethane treated vaccine | 1024 |

EXAMPLE 8

Three other representatives of the myxovirus group, namely, Influenza A/Sing/57, Influenza B/Eng and Sendai viruses, were cultured and treated with solvents as described in Example 7.

The aqueous layers after extraction were assayed for fowl red blood cells haemagglutinating activity.

|  | HA. test | | |
|---|---|---|---|
|  | 'Flu A | 'Flu B | Sendai |
| Original Allantoic Fluid | 1024 | 256 | 1024 |
| tetrachloro-ethylene treated suspension | 512 | 512 | 2048 |
| trichloro-trifluoro-ethane treated suspension | 512 | 512 | 4096 |

EXAMPLE 9

A primary vaccine (90 ml.), prepared from measles virus grown in a chick embryo tissue culture as described in Example 1, was acidified with 0.1 N hydrochloric acid to pH 6.0, and aluminium phosphate (10 mg.) suspended in water (10 ml.) was added. The mixture was stirred for an hour at room temperature and then allowed to settle overnight at 4°C.

The clear supernatent fluid was decanted, and the aluminium salt further sedimented by centrifugation. After the remaining supernatant fluid was removed, the aluminium salt was resuspended in normal solution (100 ml.) buffered to pH 6.0 by a 0.017 M Sorensen's phosphate buffer.

This constituted a purified vaccine, adsorbed on aluminium phosphate. The vaccine was tested for antigenic activity and the results were as follows.

|  | HAI. test | Neutr. test |
|---|---|---|
| Primary vaccine | 215 | 83 |
| Purified vaccine | 194 | 192 |

EXAMPLE 10

To the acidified primary vaccine of Example 9 (85.5 ml.) a 0.2 percent w/v protamine solution (4.5 ml.) and subsequently aluminium phosphate (10 mg.) suspended in water (10 ml.) were added. The mixture was stirred, sedimented and resuspended as in Example 1.

The product constituted a purified vaccine, adsorbed on aluminium phosphate with protamine. The final concentration were approx. 1 mg. $AlPO_4$/ml. and 100 μg. protamine sulphate/ml. The vaccine was tested for antigenic activity and the results were as follows.

|  | HAI. test | Neutr. test |
|---|---|---|
| Primary vaccine | 215 | 83 |
| Purified vaccine with protamine | 223 | 128 |

EXAMPLE 11

A primary vaccine (400 ml.), prepared from measles virus grown in a chick embryo tissue culture as described in Example 2, was adjusted to pH 6.0 with N hydrochloric acid (18 ml.). Aluminium phosphate (1.60 g.) suspended in water (220 ml.) was added, and after stirring the mixture was allowed to settle. After sedimentation and separation the aluminium salt was resuspended in normal saline solution (400 ml.) buffered to pH 6.0.

The product constituted a purified vaccine adsorbed on aluminium phosphate, containing 4 mg. $AlPO_4$/ml. The vaccine was tested and the results were as follows.

|  | HAI. test | Neutr. test |
|---|---|---|
| Primary vaccine | 128 | 98.5 |
| Purified vaccine | 180 | 332 |

EXAMPLE 12

The purified vaccine of the aluminium phosphate protamine type, prepared in Example 10 (320 ml.) was sedimented by centrifugation, and the separated aluminium salt was resuspended in normal buffered saline solution (80 ml.) to yield a fourfold concentrated and purified vaccine. The final concentration were approx. 4 mg. $AlPO_4$/ml. and 400 μg. protamine sulphate/ml. The vaccine was tested and results were as follows.

|  | HAI. test | Neutr. test |
|---|---|---|
| Purified vaccine | 223 | 128 |
| Purified & conc. vaccine | 512 | 512 |

EXAMPLE 13

A primary vaccine (90 ml.) prepared in Example 2, was acidified with N hydrochloric acid, to pH 6.5, and aluminium phosphate (9.8 mg.) suspended in water (10 ml.) was added. The mixture was stirred for 2 hours at 4°C, and then left to settle overnight at 4°C.

The clear supernatant fluid was decanted, and the aluminium salt further sedimented by centrifugation. Then each half of the deposit was re-suspended in a. a normal saline solution (50 ml.) buffered to pH 7.4 and b. the same buffer (12.5 ml.) to yield a fourfold concentrated vaccine.

Final concentrations were (a) 0.98 mg. $AlPO_4$/ml. and (b) 3.82 mg. $AlPO_4$/ml.

The vaccines were tested for antigenic activity and the results were as follows.

| | HAI test |
|---|---|
| Primary vaccine | 31.75 |
| Purified vaccine (a) | 90.2 |
| Purif. & conc. vaccine (b) | 640.0 |

EXAMPLE 14

A primary vaccine (45 ml.), prepared from measles virus grown in a *Erythrocebus patas* monkey kidney tissue culture as described in Example 6 was acidified to pH 6.5 with N hydrocyloric acid. Aluminium phosphate (50 mg.) suspended in water (5 ml.) was added, and the mixture was shaken at 4°C for 1 hour. The aluminium salt was then sedimented by centrifugation, and was resuspended in serum free (S.M. 199) medium 50 ml.).

This constituted a purified vaccine. The vaccine was tested and results were as follows.

| | HAI test |
|---|---|
| Primary vaccine | 64 |
| Purified vaccine | 80 |

EXAMPLE 15

An Edmonston strain of measles virus was grown and propaged in chick embryo tissue cultures maintained on a serum-free medium (SM 199). To the harvested infected tissue culture fluid (20.0 1) was added a 5 percent solution of Tween 80 (400 ml.) in normal saline and tetrachloro-ethylene (2.0 1).

The mixture was homogenised for two hours. Samples were removed at 20, 40 and 60 mins. for virus assay. The samples were centrifuged to remove tetrachloro-ethylene and 0.5 ml. undiluted fluid was added to each of 20 culture tubes of Patas monkey kidney. These tubes were observed for 14 days. No cytopathic effect was observed in any culture.

After the homogenisation, the bulk vaccine was clarified and freed of tetrachloro-ethylene by continuous-flow centrifugation. 250 ml. samples of the primary vaccine were tested in chick-embryo tissue cultures and Patas monkey kidney tissue culture for the presence of live virus. No cytopathic effect was observed in any culture after 14 days incubation.

The primary vaccine (12 1) was acidified to pH 6.0 by the addition of 0.1 N hydrochloric acid in normal saline (180 ml.). To the acidified vaccine an aluminium phosphate stock solution (1460 ml.) containing 8.13 mg. AlPO$_4$/ml. was added. The mixture was stirred for 1 hour and allowed to settle overnight at 4°C. The supernatant fluid was then removed and the aluminium phosphate suspension made up to 3.0 L. by the addition of normal saline buffered at pH 6.0 by M/90 Sorensen's phosphate buffer. The final concentration of aluminium phosphate in the concentrated vaccine was estimated at 3.84 mg./ml.

Guinea-pig Potency Tests were carried out on samples taken throughout the process, and the results were as follows:

Guinea-Pig Test Results

| Sample | Diln. | HAI | N.T. |
|---|---|---|---|
| Original tissue culture fluid | 1/1 | 19 | — |
| | 1/4 | 3.4 | — |
| Final Vaccine (4 times concentrated) | 1/1 | 32 | — |
| | 1/4 | 6.7 | — |
| Supernatant from Adsorption Repeat Test | 1/1 | 4 | — |
| Final Vaccine (four times concentrated) | 1/1 | 84.4 | 304 |
| | 1/10 | 36.8 | 122 |

EXAMPLE 16

The PR-8 strain of type A influenza virus was grown and propagated in embryonated chicken eggs. The virus-containing allantoic fluid was harvested and the virus removed by centrifugation. The sedimented virus was resuspended in isctonic saline buffered to pH 7.2 and clarified by low speed centrifugation.

The clarified virus suspension 400 ml. was brought to 0.1 percent (w/v) of Tween 80 and 400 ml. of tetrachloroethylene (400 ml.) was added. The resultant mixture was agitated in an ice bath for 5 hours.

The solvent was subsequently removed by decantation and centrifugation. The aqueous phase which constituted the vaccine, contained less than 0.01 percent tetrachloro-ethylene.

The vaccine and a sample of untreated virus were assayed for their chicken cell agglutinating titers. The results were as follows:

Untreated virus — 1308 CCA units/ml.
TCE treated virus — 2781 CCA units/ml.

EXAMPLE 17

The Ann Arbor strain of type A-1 influenza virus was grown and propagated in embryonated chicken eggs. The virus-containing allantoic fluid was harvested and the virus removed by centrifugation. The sedimented virus was resuspended is isotonic saline buffered to pH 7.2 and clarified by low speed centrifugation.

The clarified virus suspension (450 ml.) was brought to 0.1 percent (w/v) of Tween 80 and tetrachloroethylene (450 ml.) was added. The resultant mixture was agitated in an ice bath for 5 hours.

The solvent was subsequently removed by decantation and centrifugation. The aqueous phase, which constituted the vaccine, contained less than 0.01 percent tetrachloro-ethylene.

The vaccine and a sample of untreatd virus were assayed for their chicken cell agglutinating titers. The results were as follows:

Intact virus — 1717 CCA units/ml.
TCE treated virus — 2605 CCA units/ml.

EXAMPLE 18

The Japan 170 strain of type A-2 influenza virus was grown and propagated in embryonated chicken eggs. The virus-containing allantoic fluid was harvested and the virus removed by centrifugation. The sedimented virus was resuspended in isotonic saline buffered to pH 7.2 and clarified by low speed centrifugation.

The clarified virus suspension (825 ml.) was brought to 0.1 percent (w/v) of Tween 80 and tetrachloroethylene (825 ml.) was added. The resultant mixture was agitated in an ice bath for 5 hours.

The solvent was subsequently removed by decantation and centrifugation. The aqueous phase, which constituted the vaccine, contained less tha 0.01 percent tetrachloro-ethylene.

The vaccine and a sample of untreated virus were assayed for their chicken cell agglutinating titers. The results were as follows:

Intact virus — 1,331 CCA units/ml.
TCE treated virus — 2,171 CCA units/ml.

EXAMPLE 19

The Maryland strain of type B influenza virus was grown and propagated in embryonating chicken eggs. The virus-containing allantoic fluid was harvested and the virus removed by centrifugation. The sedimented virus was resuspended in isotonic saline buffered to pH 7.2 and clarified by low speed centrifugation.

The clarified virus suspension (300 ml.) was brought to 0.1 percent (w/v) of Tween 80 and tetrachloro-ethylene (300 ml.) was added. The resultant mixture was agitated in an ice bath of 5 hours.

The solvent was subsequently removed by decantation and centrifugation. The aqueous phase which constituted the vaccine, contained less that 0.01 percent tetrachloro-ethylene.

The vaccine and a sample of untreated virus were assayed for their chicken cell agglutinating titers. The results were as follows:

Untreated virus — 1794 CCA units/ml.
TCE treated virus — 1767 CCA units/ml.

What is claimed is:

1. A method for inactivating myxoviruses without significant loss of antigenic activity, which comprises contacting the myxoviruses in an aqueous suspension at a pH between pH 6 and pH 8 in the presence of at least about 0.05 percent w/v of a surface active agent selected from the class consisting of polyoxyethylene sorbitan mono-oleate, polyoxyethylene ether of partial lauric acid ester, polyoxyethylene ether of palmitic acid ester, and polyoxyethylene ether of stearic acid ester which have molecular weights in the range of 1,200 to 1,320, with an organic solvent selected from the class consisting of chlorinated lower hydrocarbon having from 2 to 5 carbon atoms and chlorinated and fluorinated lower hydrocarbon having from 2 to 5 carbon atoms, the solvent being liquid at room temperature so as to form an organic layer and an aqueous layer, and separating the aqueous layer from the organic layer after a mixing time of about 1 hour.

2. A method according to claim 1, in which the concentration of the surface active agent is between 0.05 to 0.2 percent w/v.

3. A mehod according to claim 1, in which the pH of the suspension is between 6.5 and 7.5.

4. A method according to claim 1, in which the organic solvent is selected from the class consisting of trichloro-ethylene, tetrachloro-ethylene, 1,1,2-trichloro-1,2,2-trifluoro-ethane, 1,1,1,3,3,3-hexachloro-propane and hexachloro-buta1,3-diene.

5. A method for inactivating myxoviruses without significant loss of antigenic activity, which comprises contacting the myxoviruses in an aqueous suspension at a pH between pH 6 and pH 8 in the presence of at least about 0.05 percent w/v of a surface active agent selected for the class consisting of polyoxyethylene sorbitan mono-oleate, polyoxyethylene ether of palmitic acid, ester, polyoxyethylene ether of partial lauric acid ester, and polyoxyethylene ether of stearic acid ester which have molecular weights in the range of 1,220 to 1,320, with tetrachloro-methane, the solvent being liquid at room temperature, so as to form an organic layer and an aqueous layer, and separating the aqueous layer from the organic layer after a mixing time of about 1 hour.

6. A method according to claim 5, in which the concentration of the surface active agent is between 0.05 to 0.2 percent w/v.

7. A method according to claim 5, in which the pH of the suspension is between 6.5 and 7.5.

* * * * *

UNITED STATES PATENT OFFICE
CERTIFICATE OF CORRECTION

PO-1050 (5/69)

Patent No. 3,847,737  Dated November 12, 1974

Inventor(s) Alexander David Kanarek

It is certified that error appears in the above-identified patent and that said Letters Patent are hereby corrected as shown below:

--pyrolidine--. Column 7, line 38, "supernatent" should read --supernatant--. Column 10, line 50, "untreatd" should read --untreated--.

Column 11, line 19, "of" should read --for--. Claim 3, line 1, "mehod" should read --method--. Claim 5, line 6, "for" should read --from--. Claim 5, line 8, delete the comma after "acid".

Signed and sealed this 22nd day of April 1975.

(SEAL)
Attest:

RUTH C. MASON
Attesting Officer

C. MARSHALL DANN
Commissioner of Patents
and Trademarks